(12) United States Patent
Wu et al.

(10) Patent No.: US 11,540,153 B2
(45) Date of Patent: Dec. 27, 2022

(54) LINK QUALITY MONITORING METHOD AND TERMINAL

(71) Applicant: VIVO MOBILE COMMUNICATION CO., LTD., Chang'an Dongguan (CN)

(72) Inventors: Kai Wu, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 41 days.

(21) Appl. No.: 17/121,878

(22) Filed: Dec. 15, 2020

(65) Prior Publication Data

US 2021/0099899 A1 Apr. 1, 2021

Related U.S. Application Data

(63) Continuation of application No. PCT/CN2019/090652, filed on Jun. 11, 2019.

(30) Foreign Application Priority Data

Jun. 15, 2018 (CN) .......................... 201810623953.1

(51) Int. Cl.
*H04W 24/08* (2009.01)
*H04W 72/04* (2009.01)
(Continued)

(52) U.S. Cl.
CPC ............. *H04W 24/08* (2013.01); *H04L 1/203* (2013.01); *H04L 5/0048* (2013.01);
(Continued)

(58) Field of Classification Search
CPC ..... H04W 24/08; H04W 24/06; H04W 24/04; H04W 76/27; H04W 72/042;
(Continued)

(56) References Cited

U.S. PATENT DOCUMENTS

2012/0327984 A1* 12/2012 Krishnamurthy ..... H04W 56/00
375/357
2013/0252606 A1* 9/2013 Nimbalker ........... H04B 17/309
455/434
(Continued)

FOREIGN PATENT DOCUMENTS

CN 101483927 A 7/2009
CN 107787005 A 3/2018

OTHER PUBLICATIONS

Chinese Office Action related to Application No. 201810623953.1; dated May 8, 2020.
(Continued)

*Primary Examiner* — Candal Elpenord
(74) *Attorney, Agent, or Firm* — von Briesen & Roper, s.c.

(57) ABSTRACT

A link quality monitoring method performed by a mobile terminal includes the following steps: performing, by the mobile terminal, detection for a pre-configured radio link monitoring reference signal to determine whether the radio link monitoring reference signal is received; and reporting, by the mobile terminal, based on whether the radio link monitoring reference signal is received, in-synchronization or out-of-synchronization used to indicate radio link quality of the radio link used by the mobile terminal.

20 Claims, 4 Drawing Sheets

(51) Int. Cl.
*H04L 1/20* (2006.01)
*H04W 72/08* (2009.01)
*H04W 80/02* (2009.01)
*H04W 76/27* (2018.01)
*H04L 5/00* (2006.01)

(52) U.S. Cl.
CPC ....... *H04W 72/042* (2013.01); *H04W 72/085* (2013.01); *H04W 76/27* (2018.02); *H04W 80/02* (2013.01)

(58) Field of Classification Search
CPC ... H04W 72/085; H04W 72/04; H04W 80/02; H04L 1/203; H04L 5/0048
USPC ................................................ 370/329–330
See application file for complete search history.

(56) References Cited

U.S. PATENT DOCUMENTS

| | | | |
|---|---|---|---|
| 2017/0230780 A1* | 8/2017 | Chincholi | H04L 5/14 |
| 2018/0160328 A1 | 6/2018 | Chendamarai et al. | |
| 2018/0352601 A1* | 12/2018 | Park | H04L 5/0055 |
| 2019/0052380 A1* | 2/2019 | Cui | H04B 17/318 |
| 2019/0081691 A1* | 3/2019 | Nagaraja | H04B 7/0632 |
| 2019/0182691 A1 | 6/2019 | Wang et al. | |
| 2019/0320361 A1* | 10/2019 | Uchiyama | H04W 88/04 |
| 2020/0059397 A1* | 2/2020 | da Silva | H04L 41/0654 |

OTHER PUBLICATIONS

Nokia, Nokia Shanghai Bell, "RLM/RLF measurement on NR-U", May 21-25, 2018, 3GPP TSG-RAN WG2, Meeting #102, Busan, South Korea.

Ericsson, "RRM framework in NR-U", May 21-25, 2018, 3GPP TSG-RAN #102, Busan, South Korea.

* cited by examiner

FIG. 5 ic # LINK QUALITY MONITORING METHOD AND TERMINAL

CROSS-REFERENCE TO RELATED APPLICATIONS

The present application is a continuation application of PCT Application No. PCT/CN2019/090652 filed on Jun. 11, 2019, which claims a priority of the Chinese patent application No. 201810623953.1 filed on Jun. 15, 2018, which are incorporated herein by reference in their entirety.

TECHNICAL FIELD

This disclosure relates to the field of wireless communication technologies, and in particular, to a link quality monitoring method and a terminal.

BACKGROUND

Due to factors such as interference and fading, links between a network side and a terminal (UE) may stop working for a long time. In this case, a radio link failure procedure is initiated. The UE reports an indication of in-synchronization (IS) or out-of-synchronization (OOS) to a higher layer. If OOS is continuously reported for a specific number of times, it is considered that a radio link has failed.

The network side configures X radio link monitoring reference signals (RLM-RS) for the UE to perform radio link monitoring and estimate radio link quality. The radio link quality is determined based on a hypothetical physical downlink control channel block error rate (PDCCH-BLER).

In new radio licensed assisted access (NR-LAA), before transmitting information, a transmit node (for example, a network-side device or UE) needs to perform clear channel assessment/extended clear channel assessment (CCA/eCCA) to listen to a channel, and can start transmission only when the channel is determined to be idle.

An unlicensed frequency band is shared by a plurality of technologies. Therefore, this type of contention-based access method leads to uncertainty of channel available time. Configuring an RS at a fixed location in NR is no longer applicable to unlicensed frequency bands, because even if the network-side device configures the UE with an RLM-RS for periodic transmission, the network-side device determines through channel listening that a channel is not idle before an RS transmission moment, and the RLM-RS is not actually sent at a time point configured by the network-side device for transmitting the RLM-RS. If the UE still estimates a hypothetical PDCCH-BLER based on the RS according to the existing mechanism in NR, credibility of an IS or OOS result reported to a higher layer is significantly affected.

SUMMARY

According to a first aspect, some embodiments of this disclosure provide a link quality monitoring method applied to a terminal, including:

performing detection for a pre-configured radio link monitoring reference signal RLM-RS to determine whether the RLM-RS is received; and reporting, based on whether the RLM-RS is received, in-synchronization in-sync or out-of-synchronization out-of-sync used to indicate link quality.

According to a second aspect, some embodiments of this disclosure provide a terminal, including:

a detection module, configured to perform detection for a pre-configured radio link monitoring reference signal RLM-RS to determine whether the RLM-RS is received; and a reporting module, configured to report, based on whether the RLM-RS is received, in-synchronization in-sync or out-of-synchronization out-of-sync used to indicate link quality.

According to a third aspect, some embodiments of this disclosure provide a terminal, including a processor, a memory, and a computer program that is stored in the memory and capable of running on the processor, where when the computer program is executed by the processor, the steps of the foregoing link quality monitoring method are implemented.

According to a fourth aspect, some embodiments of this disclosure provide a computer-readable storage medium, where the computer-readable storage medium stores a computer program, and when the computer program is executed by a processor, the steps of the foregoing link quality monitoring method are implemented.

BRIEF DESCRIPTION OF DRAWINGS

Those of ordinary skill in the art will be clear about other advantages and benefits by reading the detailed description of the optional embodiments below. The accompanying drawings are merely intended to illustrate the objectives of the optional embodiments and should not be interpreted as limiting this disclosure. Throughout the accompanying drawings, the same reference numerals represent the same components. In the drawings.

DESCRIPTION OF EMBODIMENTS

The following clearly and completely describes the technical solutions in some embodiments of this disclosure with reference to the accompanying drawings of the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Terms "include", "comprise" and any other variants thereof in the specification and claims of this application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In some embodiments of this disclosure, the word such as "exemplary" or "for example" is used to represent giving an example, an instance, or an illustration. Any embodiment or design scheme described as "exemplary" or "for example" in some embodiments of this disclosure should not be construed as being more preferred or advantageous than other embodiments or design schemes. Exactly, use of the word "exemplary" or "for example" or the like is intended to present a related concept in a specific manner.

The embodiments of this disclosure are introduced below with reference to the accompanying drawings. A link quality monitoring method and a terminal that are provided in some embodiments of this disclosure may be applied to a wireless communications system. The wireless communications system may be a 5G system, or an evolved long term evolution (eLTE) system, or a later evolved communications system.

Figure 1:
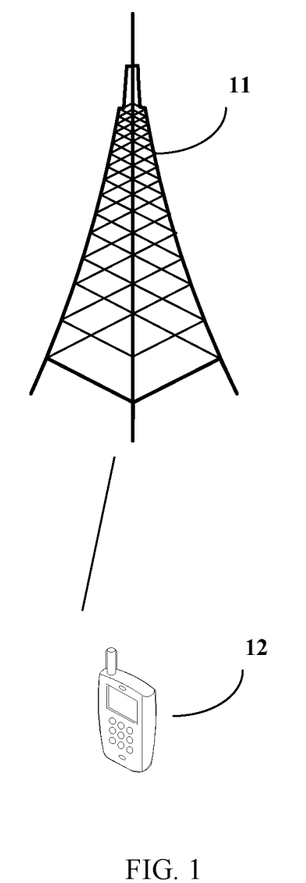
FIG. 1 is a schematic architectural diagram of a wireless communications system according to some embodiments of this disclosure.

FIG. 1 is a schematic architectural diagram of a wireless communications system according to some embodiments of this disclosure. As shown in FIG. 1, the wireless communications system may include a network device 11 and a terminal. For example, the terminal is denoted as UE 12. The UE 12 may be connected to the network device 11. In practical application, the connection between the foregoing devices may be a wireless connection. For ease of visually representing the connection relationships between the devices, a solid line is used for illustration in FIG. 1.

It should be noted that the above communications system may include a plurality of UEs, and that the network device may communicate with a plurality of UEs (for transmission of signaling or data).

The network device 11 provided in some embodiments of this disclosure may be a base station. The base station may be a commonly used base station or an evolved NodeB (eNB), or may be a network-side device (for example, a next generation NodeB (gNB) in a 5G system, or a transmission and reception point (TRP)), a cell, or the like. Alternatively, the base station may be a network-side device in a later evolved communications system. However, the wording does not constitute any limitation.

The UE 12 provided in some embodiments of this disclosure may be a mobile phone, a tablet computer, a notebook computer, an ultra-mobile personal computer (UMPC), a netbook, a personal digital assistant (PDA), or the like. A person skilled in the art can understand that the wording does not constitute any limitation.

Figure 2:
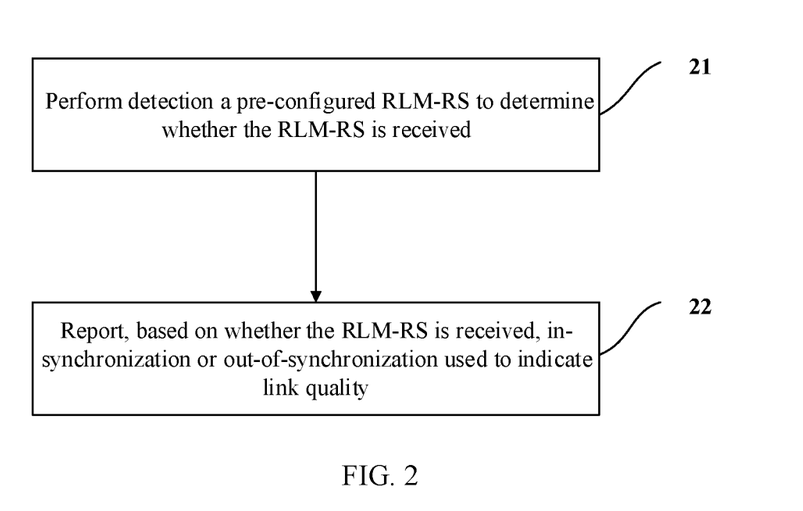
FIG. 2 is a schematic flowchart of a link quality monitoring method according to this disclosure.

FIG. 2 is a schematic flowchart of a link quality monitoring method according to some embodiments of this disclosure. The method is applied to a terminal and includes the following steps.

Step 21: Perform detection for a pre-configured RLM-RS to determine whether the RLM-RS is received.

Step 22: Report, based on whether the RLM-RS is received, in-sync or out-of-sync used to indicate link quality.

In some embodiments of this disclosure, link quality estimation is performed based on an RLM-RS reception status, instead of estimating a hypothetical PDCCH-BLER based on an RLM-RS regardless of whether the RLM-RS is received, thereby improving credibility of the reported in-sync or out-of-sync and improving communication efficiency.

The reporting in some embodiments of this disclosure means reporting to a higher layer of the terminal.

In some embodiments of this disclosure, the terminal may fail to receive the RLM-RS for two reasons. One is poor link quality, resulting in that a network-side device transmits the RLM-RS but the terminal fails to receive it. The other one is that on an unlicensed frequency band, a channel is determined to be not idle through channel listening performed by a network-side device before an RLM-RS transmit moment, and consequently, the RLM-RS is actually not sent at a time point configured by the network-side device for transmitting the RLM-RS.

In some embodiments of this disclosure, optionally, the pre-configured RLM-RS is a periodic RLM-RS. When the pre-configured RLM-RS is a periodic RLM-RS, the terminal periodically performs detection for the pre-configured RLM-RS.

In some embodiments of this disclosure, optionally, there may be one or more pre-configured RLM-RSs, and a quantity of RLM-RSs is configured by a network side or specified by a protocol. Optionally, when a frequency band is below 3 GHz, a maximum quantity of RLM-RSs is 2; when the frequency band is between 3 GHz to 6 GHz, the maximum quantity of RLM-RSs is 4; when the frequency band is above 6 GHz, the maximum quantity of RLM-RSs is 8.

In some embodiments of this disclosure, optionally, the RLM-RS may include a channel state information reference signal (CSI-RS) and/or a synchronization signal & PBCH block (SS/PBCH block or SSB).

In some embodiments of this disclosure, optionally, before the step of performing detection for a pre-configured RLM-RS to determine whether the RLM-RS is received, the following step may be further included:

Step 22a: Receive configuration information of the RLM-RS, where the configuration information includes a location of a time-frequency resource for transmitting each RLM-RS and a parameter for generating a sequence of the RLM-RS.

The step of performing detection for a pre-configured RLM-RS to determine whether the RLM-RS is received includes: at the transmitting location of the time-frequency resource, performing sequence correlation detection on the RLM-RS based on the parameter for generating the sequence of the RLM-RS, to determine whether the RLM-RS is received.

The terminal may learn, based on a network side configuration or a protocol agreement, the parameter for generating the sequence of the RLM-RS; perform, at a pre-configured time-frequency resource location, correlation detection on the detected sequence based on the parameter for generating the sequence of the RLM-RS; and when correlation of the detected sequence is greater than a preset value, determine that the RLM-RS is received; otherwise, determine that the RLM-RS is not received. For those skilled in the art, generally, reception of the RLM-RS can also mean successful reception of the RLM-RS.

In some embodiments of this disclosure, optionally, the step of reporting, based on whether the RLM-RS is received, in-sync or out-of-sync used to indicate link quality includes the following steps:

Step 221: When one such RLM-RS is received, estimate a hypothetical PDCCH-BLER corresponding to the received RLM-RS.

In some embodiments of this disclosure, the terminal may use Qin and Qout as indicators for link quality estimation. Qout represents a threshold that link quality of a downlink cannot meet a requirement for reliable reception, and corresponds to a PDCCH BLER of the out-of-sync. Qin corresponds to a threshold that link quality is much higher than the link quality of Qout, and corresponds to a PDCCH BLER of the in-sync. Qin and Qout may be signal to interference plus noise ratio (SINR) thresholds. The terminal may obtain estimation of a hypothetical PDCCH-BLER based on the signal to interference plus noise ratio indicator. That is, provided that an estimated value of the SINR indicator is determined to be greater/less than a corresponding threshold, a relationship between a hypothetical PDCCH-BLER of a current radio link and BLER_in (a threshold for reporting the in-sync)/BLER_out (a threshold for reporting the out-of-sync) can be determined. Certainly, other indicators may be used to estimate a hypothetical PDCCH-BLER.

Step 222: When one such RLM-RS is not received, skip estimating a hypothetical PDCCH-BLER corresponding to the unreceived RLM-RS.

Step 223: Report, based on an estimation result of the hypothetical PDCCH-BLER corresponding to the received RLM-RS, and/or a quantity of unreceived RLM-RSs, the in-sync or out-of-sync used to indicate link quality.

In some embodiments of this disclosure, when one such RLM-RS is received, a hypothetical PDCCH-BLER is estimated; or when one such RLM-RS is not received, a hypothetical PDCCH-BLER is not estimated, but a quantity of unreceived RLM-RSs may be recorded to estimate link quality based on a specific situation, thereby improving accuracy of link quality estimation.

In some embodiments of this disclosure, optionally, the step of reporting, based on an estimation result of the hypothetical PDCCH-BLER corresponding to the received RLM-RS, and/or a quantity of unreceived RLM-RSs, the in-sync used to indicate link quality may include:

reporting the in-sync when a quantity of first RLM-RSs among the received RLM-RSs is greater than or equal to a first value, where a hypothetical PDCCH-BLER corresponding to the first RLM-RS is lower than a first threshold.

In some embodiments of this disclosure, optionally, the first value is 1, that is, the in-sync can be reported provided that a hypothetical PDCCH-BLER corresponding to one of the received RLM-RS is less than the first threshold.

When a link is required to provide better transmission quality, reporting criteria of the in-sync may be improved. Further, the in-sync is reported when the quantity of first RLM-RSs is greater than or equal to the first value and at least one of the following criteria is also met:

1) a quantity of second RLM-RSs among the received RLM-RSs is less than or equal to a second value, where a hypothetical PDCCH-BLER corresponding to the second RLM-RS is higher than a second threshold;

2) a quantity of third RLM-RSs is less than or equal to a third value, where the third RLM-RS is an unreceived RLM-RS; and 3) a sum of the quantity of second RLM-RSs and the quantity of third RLM-RSs is less than or equal to a fourth value.

In some embodiments of this disclosure, optionally, the step of reporting, based on an estimation result of the hypothetical PDCCH-BLER corresponding to the received RLM-RS, and/or a quantity of unreceived RLM-RSs, the out-of-sync used to indicate link quality may include:

The out-of-sync is reported when at least one of the following criteria is met:

1) a quantity of first RLM-RSs among the received RLM-RSs is less than a first value, where a hypothetical PDCCH-BLER corresponding to the first RLM-RS is lower than a first threshold;

2) a quantity of third RLM-RSs is greater than or equal to a fifth value, where the third RLM-RS is an unreceived RLM-RS;

3) a sum of a quantity of second RLM-RSs among the received RLM-RSs and the quantity of third RLM-RSs is greater than or equal to a sixth value, where a hypothetical PDCCH-BLER corresponding to the second RLM-RS is higher than a second threshold; and 4) the quantity of the second RLM-RSs is greater than or equal to a seventh value.

In some embodiments of this disclosure, at least one of the first value, the second value, the third value, the fourth value, the fifth value, the sixth value, and the seventh value is determined by the terminal, or configured by the network-side device through radio resource control (RRC) signaling, or indicated by the network-side device through a media access control control element (MAC CE), or indicated by the network-side device through downlink control information (DCI).

The first threshold and the second threshold may also be determined by the terminal, or configured by the network-side device through RRC signaling, or indicated by the network-side device through a MAC CE, or indicated by the network-side device through DCI.

The foregoing methods of some embodiments of this disclosure may be applied to radio link monitoring of a licensed frequency band, or may be applied to radio link monitoring of an unlicensed frequency band.

Examples are used below to describe the link quality monitoring method of this disclosure with reference to specific embodiments.

In a specific embodiment, the terminal uses a CSI-RS as the RLM-RS based on a configuration in the RRC signaling sent by the network-side device. It is assumed that eight CSI-RSs are configured by the network-side device for the terminal to perform radio link monitoring.

Based on the configuration in the RRC signaling sent by the network-side device, the terminal performs detection for the CSI-RS on a configured time-frequency resource at which the CSI-RS is expected to be sent, to determine whether the CSI-RS is received:

a) if the CSI-RS is received, a hypothetical PDCCH BLER corresponding to the CSI-RS is estimated; or b) if the CSI-RS is not received, a hypothetical PDCCH BLER corresponding to the CSI-RS is not estimated.

It is assumed that hypothetical PDCCH BLERs corresponding to A of the eight CSI-RSs configured by the network-side device are less than a threshold BLER_in (BLER_in is the first threshold in the foregoing embodiment); hypothetical PDCCH BLERs corresponding to B CSI-RSs are greater than a threshold BLER_Q_out (BLER_Q_out is the second threshold in foregoing embodiment); and hypothetical PDCCH BLERs corresponding to C CSI-RSs are not estimated because the terminal has not received the C CSI-RSs.

The terminal determines whether to report the in-sync or out-of-sync to the higher layer based on quantities of CSI-RSs in the above three scenarios. Specifically:

a) the in-sync is reported when A>=TH_A (TH_A is the first value in the foregoing embodiment).

If the link is required to provide better transmission quality, that is, when more stringent in-sync reporting criteria are needed, TH_A may be set to a larger value; or the in-sync is reported when A>=TH_A and when at least one of the following three criteria is met: C<=TH_C_in (TH_C_in is the third value in the foregoing embodiment), B<=TH_B_in (TH_B_in is the second value in the foregoing embodiment), and B+C<=TH_BC_in (TH_BC_in is the fourth value in the foregoing embodiment).

b) The terminal reports the out-of-sync when at least one of the following criteria is met:

A<TH_A;

C>=TH_C_out (TH_C_out is the fifth value in the foregoing embodiment);

B>=TH_B_out (TH_B_out is the seventh value in the foregoing embodiment); and

B+C>=TH_BC_Out (TH_BC_Out is the sixth value in the foregoing embodiment).

When the link is required to provide better transmission quality, TH_B_out, TH_C_out, and TH_BC_out may be set to smaller values; otherwise, they may be set to larger values.

Values of TH_A, TH_B_in, TH_C_in, TH_C_out, TH_B-C_in, and TH_BC_out may be determined by the terminal, or configured by the network-side device through RRC signaling, or indicated by the network-side device through a MAC CE, or indicated by the network-side device through DCI.

Figure 3:
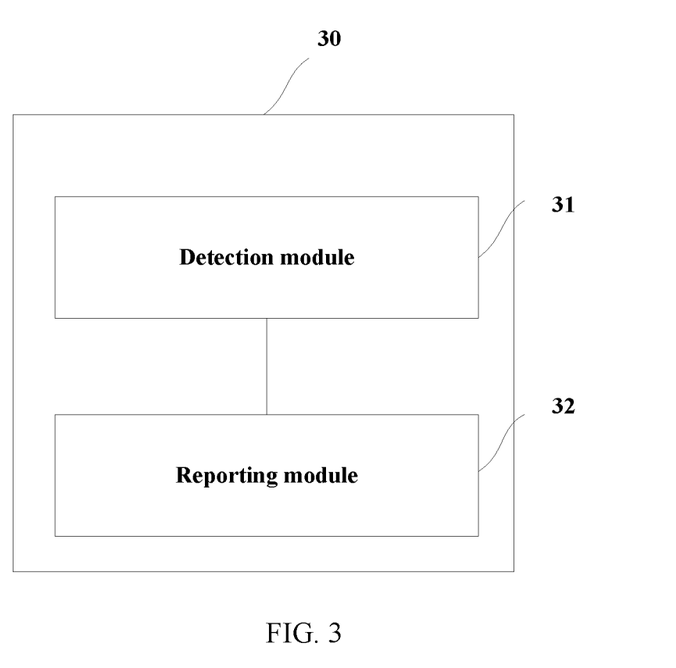
FIG. 3 is a schematic structural diagram of a terminal according to this disclosure.

Referring to FIG. 3, some embodiments of this disclosure provide a terminal 30, including:

a detection module 31, configured to perform detection for a pre-configured radio link monitoring reference signal RLM-RS to determine whether the RLM-RS is received; and a reporting module 32, configured to report, based on whether the RLM-RS is received, in-synchronization in-sync or out-of-synchronization out-of-sync used to indicate link quality.

In some embodiments of this disclosure, link quality estimation is performed based on an RLM-RS reception status, instead of estimating a hypothetical PDCCH-BLER based on an RLM-RS regardless of whether the RLM-RS is received, thereby improving credibility of the reported in-sync or out-of-sync.

In some optional embodiments of this disclosure, the reporting module 32 includes:

a first processing submodule, configured to: when one such RLM-RS is received, estimate a hypothetical physical downlink control channel block error rate PDCCH-BLER corresponding to the received RLM-RS;

a second processing submodule, configured to: when one such RLM-RS is not received, skip estimating a hypothetical PDCCH-BLER corresponding to the unreceived RLM-RS; and a third processing submodule, configured to report, based on an estimation result of the hypothetical PDCCH-BLER corresponding to the received RLM-RS, and/or a quantity of unreceived RLM-RSs, the in-sync or out-of-sync used to indicate link quality.

In some optional embodiments of this disclosure, the third processing submodule is configured to report the in-sync when a quantity of first RLM-RSs among the received RLM-RSs is greater than or equal to a first value, where a hypothetical PDCCH-BLER corresponding to the first RLM-RS is lower than a first threshold.

In some optional embodiments of this disclosure, the third processing submodule is configured to report the in-sync when the quantity of first RLM-RSs is greater than or equal to the first value and at least one of the following criteria is also met:

a quantity of second RLM-RSs among the received RLM-RSs is less than or equal to a second value, where a hypothetical PDCCH-BLER corresponding to the second RLM-RS is higher than a second threshold;

a quantity of third RLM-RSs is less than or equal to a third value, where the third RLM-RS is an unreceived RLM-RS; and a sum of the quantity of second RLM-RSs and the quantity of third RLM-RSs is less than or equal to a fourth value.

In some optional embodiments of this disclosure, at least one of the first value, the second value, the third value, and the fourth value is determined by the terminal, or configured by a network-side device through RRC signaling, or indicated by a network-side device through a MAC CE, or indicated by a network-side device through DCI.

In some optional embodiments of this disclosure, the third processing submodule is configured to report the out-of-sync when at least one of the following criteria is met:

a quantity of first RLM-RSs among the received RLM-RSs is less than a first value, where a hypothetical PDCCH-BLER corresponding to the first RLM-RS is lower than a first threshold;

a quantity of third RLM-RSs is greater than or equal to a fifth value, where the third RLM-RS is an unreceived RLM-RS; and a sum of a quantity of second RLM-RSs among the received RLM-RSs and the quantity of third RLM-RSs is greater than or equal to a sixth value, where a hypothetical PDCCH-BLER corresponding to the second RLM-RS is higher than a second threshold.

In some optional embodiments of this disclosure, at least one of the first value, the fifth value, and the sixth value is determined by the terminal, or configured by a network-side device through RRC signaling, or indicated by a network-side device through a MAC CE, or indicated by a network-side device through DCI.

In some optional embodiments of this disclosure, the first value is 1.

In some optional embodiments of this disclosure, the terminal further includes:

a receiving module, configured to receive configuration information of the RLM-RS, where the configuration information includes a location of a time-frequency resource for transmitting each RLM-RS and a parameter for generating a sequence of the RLM-RS, where the detection module is configured to: at the transmitting location of the time-frequency resource, perform sequence correlation detection on the RLM-RS based on the parameter for generating the sequence of the RLM-RS, to determine whether the RLM-RS is received.

Figure 4:
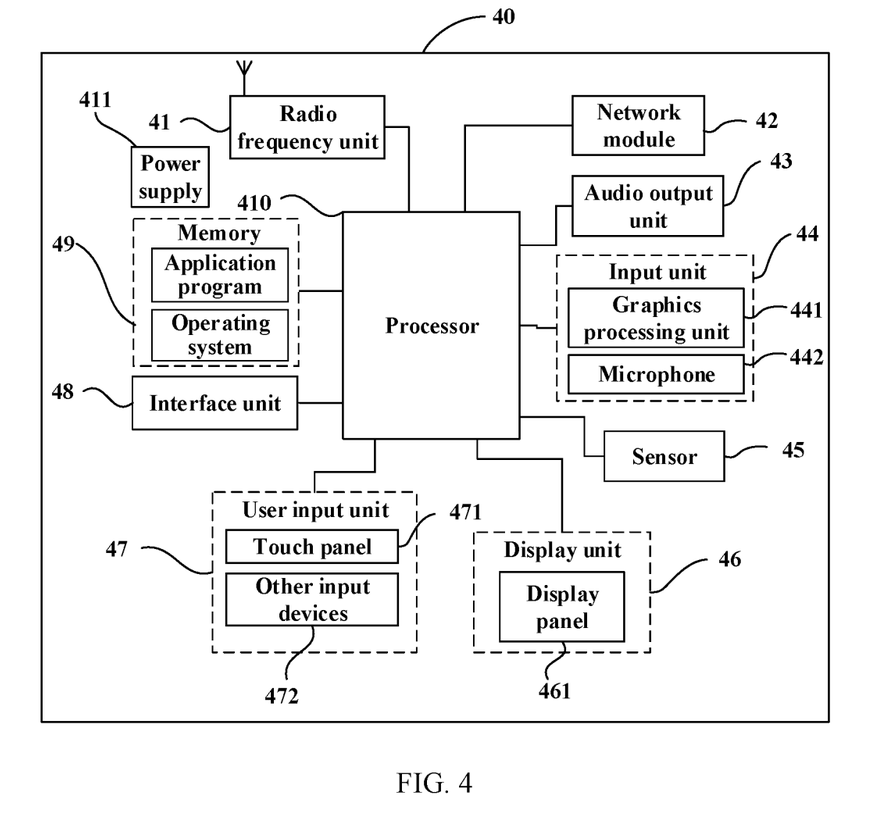
FIG. 4 is another schematic structural diagram of a terminal according to this disclosure.

FIG. 4 is another schematic structural diagram of a terminal according to this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art can understand that a structure of the terminal shown in FIG. 4 does not constitute any limitation on the terminal, and the terminal may include more or fewer components than those shown in the figure, or some components may be combined, or the components may be disposed in different manners. In some embodiments of this disclosure, the terminal includes but is not limited to a mobile phone, a tablet computer, a laptop computer, a palmtop computer, an in-vehicle terminal, a wearable device, a pedometer, or the like.

The processor 410 is configured to perform detection for a pre-configured RLM-RS to determine whether the RLM-RS is received; and report, based on whether the RLM-RS is received, in-synchronization in-sync or out-of-synchronization out-of-sync used to indicate link quality.

In some embodiments of this disclosure, link quality estimation is performed based on an RLM-RS reception status, instead of estimating a hypothetical PDCCH-BLER based on an RLM-RS regardless of whether the RLM-RS is received, thereby improving credibility of the reported in-sync or out-of-sync.

It should be understood that in some embodiments of this disclosure, the radio frequency unit 41 may be configured to receive and transmit signals in an information receiving/transmitting process or a call process; and specifically, after receiving downlink data from a base station, transmit the downlink information to the processor 410 for processing, and in addition, transmit uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may further communicate with a network and another device through a wireless communications system.

The terminal provides wireless broadband interne access for a user by using the network module 42, for example, helping the user to transmit and receive e-mails, to browse web pages, and to access streaming media.

The audio output unit 43 may convert audio data received by the radio frequency unit 41 or the network module 42 or stored in the memory 49 into an audio signal and output the audio signal as a sound. In addition, the audio output unit 43 may also provide audio output (for example, a call signal received sound or a message received sound) related to a specific function performed by the terminal 40. The audio output unit 43 includes a speaker, a buzzer, a telephone receiver, and the like.

The input unit 44 is configured to receive an audio or video signal. The input unit 44 may include a graphics processing unit (GPU) 441 and a microphone 442, and the graphics processing unit 4101 processes image data of a still picture or a video obtained by an image capture apparatus (for example, a camera) in an image capture mode or a video capture mode. A processed image frame may be displayed on the display unit 46. An image frame processed by the graphics processing unit 441 may be stored in the memory 49 (or another storage medium) or sent by the radio frequency unit 41 or the network module 42. The microphone 442 can receive a sound and can process the sound into audio data. The processed audio data can be converted into a format that can be sent to a mobile communication base station through the radio frequency unit 41 in a telephone call mode, for output.

The terminal 40 further includes at least one sensor 45, for example, a light sensor, a motion sensor, and another sensor. Specifically, the light sensor includes an ambient light sensor and a proximity sensor, where the ambient light sensor can adjust luminance of the display panel 461 based on brightness of ambient light, and the proximity sensor can turn off the display panel 461 and/or backlight when the terminal 40 is moved to an ear. As a type of motion sensor, an accelerometer sensor can detect magnitudes of accelerations in all directions (usually three axes), can detect a magnitude and a direction of gravity when the mobile phone is in a static state, and can be applied to terminal posture recognition (such as screen switching between portrait and landscape, related games, and magnetometer posture calibration), functions related to vibration recognition (such as pedometer and tapping), and the like. The sensor 45 may also include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided for the user. The display unit 46 may include a display panel 461, and the display panel 461 may be configured in the form of a liquid crystal display (LCD), an organic light-emitting diode (OLED), or the like.

The user input unit 47 may be configured to receive input digit or character information and generate key signal input related to user setting and function control of the terminal. Specifically, the user input unit 47 includes a touch panel 471 and other input devices 472. The touch panel 471, also referred to as a touchscreen, may capture a touch operation performed by a user on or near the touch panel (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information to point coordinates, and transmits the point coordinates to the processor 410, and receives and executes a command sent by the processor 410. In addition, the touch panel 471 may be implemented in a plurality of forms, for example, as a resistive, capacitive, infrared, or surface acoustic wave touch panel. The user input unit 47 may further include the other input devices 472 in addition to the touch panel 471. Specifically, the other input devices 472 may include but are not limited to a physical keyboard, a function key (such as a volume control key or a power on/off key), a trackball, a mouse, a joystick, and the like. Details are not described herein.

Further, the touch panel 471 may cover the display panel 461. After detecting a touch operation on or near the touch panel 471, the touch panel 471 transmits information about the touch operation to the processor 410 for the processor 410 to determine a touch event type, and then the processor 410 provides a corresponding visual output on the display panel 461 based on the touch event type. Although in FIG. 4, the touch panel 471 and the display panel 461 act as two independent parts to implement input and output functions of the terminal, in some embodiments, the touch panel 471 and the display panel 461 may be integrated to implement the input and output functions of the terminal. This is not specifically limited herein.

The interface unit 48 is an interface connecting an external apparatus to the terminal 40. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 48 may be configured to: receive input (for example, data information or power) from the external apparatus, and transmit the received input to one or more elements in the terminal 40, or may be configured to transmit data between the terminal 40 and the external apparatus.

The memory 49 may be configured to store a software program and various data. The memory 49 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 49 may include a high-speed random access memory, or may include a non-volatile memory, for example, at least one magnetic disk storage device, a flash memory device, or other volatile solid-state storage devices.

The processor 410 is a control center of the terminal, and is connected to all components of the terminal by using various interfaces and lines. By running or executing software programs and/or modules stored in the memory 49 and calling data stored in the memory 49, the processor 410 executes various functions of the terminal and processes data, so as to perform overall monitoring on the terminal. The processor 410 may include one or more processing units. Optionally, an application processor and a modem processor may be integrated into the processor 410. The application processor mainly processes the operating system, user interface, application program, and the like. The modem processor mainly processes wireless communication. It may be understood that the modem processor may alternatively not be integrated into the processor 410.

The terminal 40 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal 40 includes some functional modules that are not shown, details of which are not described herein.

Figure 5:
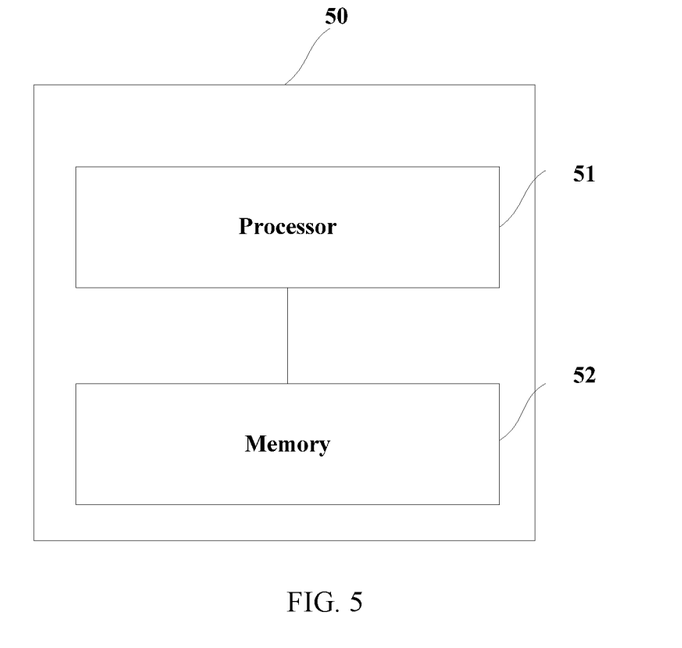
FIG. 5 is still another schematic structural diagram of a terminal according to this disclosure.

FIG. 5 is another schematic structural diagram of a terminal according to this disclosure. The terminal 50 includes a processor 51 and a memory 52. In some embodiments of this disclosure, the terminal 50 further includes a computer program that is stored on the memory 52 and capable of running on the processor 51, where when the computer program is executed by the processor 51, the following steps are implemented:

performing detection for a pre-configured radio link monitoring reference signal RLM-RS to determine whether the RLM-RS is received; and reporting, based on whether the RLM-RS is received, in-synchronization in-sync or out-of-synchronization out-of-sync used to indicate link quality.

The processor 51 is responsible for management of the bus architecture and general processing, and the memory 52 may store data used by the processor 51 when the processor 51 performs an operation.

Optionally, when the computer program is executed by the processor 51, the following steps may be further implemented:

when one such RLM-RS is received, estimating a hypothetical physical downlink control channel block error rate PDCCH-BLER corresponding to the received RLM-RS; or when one such RLM-RS is not received, skipping estimating a hypothetical PDCCH-BLER corresponding to the unreceived RLM-RS; and reporting, based on an estimation result of the hypothetical PDCCH-BLER corresponding to the received RLM-RS, and/or a quantity of unreceived RLM-RSs, the in-sync or out-of-sync used to indicate link quality.

Optionally, when the computer program is executed by the processor 51, the following step may be further implemented:

reporting the in-sync when a quantity of first RLM-RSs among the received RLM-RSs is greater than or equal to a first value, where a hypothetical PDCCH-BLER corresponding to the first RLM-RS is lower than a first threshold.

Optionally, when the computer program is executed by the processor 51, the following step may be further implemented:

reporting the in-sync when the quantity of first RLM-RSs is greater than or equal to the first value and at least one of the following criteria is also met:

a quantity of second RLM-RSs among the received RLM-RSs is less than or equal to a second value, where a hypothetical PDCCH-BLER corresponding to the second RLM-RS is higher than a second threshold;

a quantity of third RLM-RSs is less than or equal to a third value, where the third RLM-RS is an unreceived RLM-RS; and a sum of the quantity of second RLM-RSs and the quantity of third RLM-RSs is less than or equal to a fourth value.

Optionally, at least one of the first value, the second value, the third value, and the fourth value is determined by the terminal, or configured by a network-side device through radio resource control RRC signaling, or indicated by a network-side device through a media access control control element MAC CE, or indicated by a network-side device through downlink control information DCI.

Optionally, when the computer program is executed by the processor 51, the following step may be further implemented:

reporting the out-of-sync when at least one of the following criteria is met:

a quantity of first RLM-RSs among the received RLM-RSs is less than a first value, where a hypothetical PDCCH-BLER corresponding to the first RLM-RS is lower than a first threshold;

a quantity of third RLM-RSs is greater than or equal to a fifth value, where the third RLM-RS is an unreceived RLM-RS; and a sum of a quantity of second RLM-RSs among the received RLM-RSs and the quantity of third RLM-RSs is greater than or equal to a sixth value, where a hypothetical PDCCH-BLER corresponding to the second RLM-RS is higher than a second threshold.

Optionally, at least one of the first value, the fifth value, and the sixth value is determined by the terminal, or configured by a network-side device through RRC signaling, or indicated by a network-side device through a MAC CE, or indicated by a network-side device through DCI.

Optionally, the first value is 1.

Optionally, when the computer program is executed by the processor 51, the following steps may be further implemented:

receiving configuration information of the RLM-RS, where the configuration information includes a location of a time-frequency resource for transmitting each RLM-RS and a parameter for generating a sequence of the RLM-RS; and at the transmitting location of the time-frequency resource, performing sequence correlation detection on the RLM-RS based on the parameter for generating the sequence of the RLM-RS, to determine whether the RLM-RS is received.

Some embodiments of this disclosure further provide a computer-readable storage medium. The computer-readable storage medium stores a computer program. When the computer program is executed by a processor, the processes of the foregoing embodiments of the link quality monitoring method are implemented, with the same technical effects achieved. To avoid repetition, details are not described herein again. The computer-readable storage medium may be a read-only memory (ROM), a random access memory (RAM), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related technologies may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

The invention claimed is:

1. A link quality monitoring method comprising:
   performing, by a terminal, detection for a pre-configured radio link monitoring reference signal (RLM-RS) to determine whether the RLM-RS is received; and
   reporting, by the terminal, based on whether the RLM-RS is received, in-synchronization (in-sync) or out-of-synchronization (out-of-sync) used to indicate link quality,
   wherein the step of reporting, by the terminal, based on whether the RLM-RS is received, in-sync or out-of-sync used to indicate link quality comprises:
   when one such RLM-RS is received, estimating, by the terminal, a hypothetical physical downlink control channel block error rate (PDCCH-BLER) corresponding to the received RLM-RS; or
   when one such RLM-RS is not received, skipping, by the terminal, estimating a hypothetical PDCCH-BLER corresonding to the unreceived RLM-RS; and
   reporting, by the terminal, the in-sync or out-of-sync used to indicate link quality, based on an estimation result of the hypothetical PDCCH-BLER corresponding to the received RLM-RS and a quantity of unreceived RLM-RSs; or
   reporting, by the terminal, the in-sync or out-of-sync used to indicate link quality, based on a quantity of unreceived RLM-RSs.

2. The link quality monitoring method according to claim 1, wherein the step of reporting, by the terminal, the in-sync used to indicate link quality, based on the estimation result of the hypothetical PDCCH-BLER corresponding to the received RLM-RS and a quantity of unreceived RLM-RSs; or reporting, by the terminal, the in-sync used to indicate link quality, based on a quantity of unreceived RLM-RSs comprises:
   reporting, by the terminal, the in-sync when a quantity of first RLM-RSs among the received RLM-RSs is greater than or equal to a first value, wherein a hypothetical PDCCH-BLER corresponding to the first RLM-RS is lower than a first threshold.

3. The link quality monitoring method according to claim 2, wherein the step of reporting, by the terminal, the in-sync when a quantity of first RLM-RSs among the received RLM-RSs is greater than or equal to a first value further comprises:
   reporting, by the terminal, the in-sync when the quantity of first RLM-RSs is greater than or equal to the first value and at least one of the following criteria is also met:
   a quantity of second RLM-RSs among the received RLM-RSs is less than or equal to a second value, wherein a hypothetical PDCCH-BLER corresponding to the second RLM-RS is higher than a second threshold;
   a quantity of third RLM-RSs is less than or equal to a third value, wherein the third RLM-RS is an unreceived RLM-RS; or
   a sum of the quantity of second RLM-RSs and the quantity of third RLM-RSs is less than or equal to a fourth value.

4. The link quality monitoring method according to claim 3, wherein at least one of the first value, the second value, the third value, and the fourth value is determined by the terminal, or configured by a network-side device through radio resource control (RRC) signaling, or indicated by a network-side device through a media access control control element (MAC CE), or indicated by a network-side device through downlink control information (DCI).

5. The link quality monitoring method according to claim 1, wherein the step of reporting, by the terminal, the out-of-sync used to indicate link quality, based on the estimation result of the hypothetical PDCCH-BLER corresponding to the received RLM-RS and a quantity of unreceived RLM-RSs; or reporting, by the terminal, the out-of-sync used to indicate link quality, based on a quantity of unreceived RLM-RSs comprises:
   reporting, by the terminal, the out-of-sync when at least one of the following criteria is met:
   a quantity of first RLM-RSs among the received RLM-RSs is less than a first value, wherein a hypothetical PDCCH-BLER corresponding to the first RLM-RS is lower than a first threshold;
   a quantity of third RLM-RSs is greater than or equal to a fifth value, wherein the third RLM-RS is an unreceived RLM-RS; or
   a sum of a quantity of second RLM-RSs among the received RLM-RSs and the quantity of third RLM-RSs is greater than or equal to a sixth value, wherein a hypothetical PDCCH-BLER corresponding to the second RLM-RS is higher than a second threshold.

6. The link quality monitoring method according to claim 5, wherein at least one of the first value, the fifth value, and the sixth value is determined by the terminal, or configured by a network-side device through RRC signaling, or indicated by a network-side device through a MAC CE, or indicated by a network-side device through DCI.

7. The link quality monitoring method according to claim 2, wherein the first value is 1.

8. The link quality monitoring method according to claim 1, wherein
before the step of performing, by the terminal, detection for a pre-configured RLM-RS to determine whether the RLM-RS is received, the method further comprises:
receiving, by the terminal, configuration information of the RLM-RS, wherein the configuration information comprises a location of a time-frequency resource for transmitting each RLM-RS and a parameter for generating a sequence of the RLM-RS; and
the performing, by the terminal, detection for a pre-configured RLM-RS to determine whether the RLM-RS is received comprises:
at the transmitting location of the time-frequency resource, performing, by the terminal, sequence correlation detection on the RLM-RS based on the parameter for generating the sequence of the RLM-RS, to determine whether the RLM-RS is received.

9. A terminal, comprising a processor, a memory, and a computer program that is stored in the memory and capable of running on the processor, wherein when the computer program is executed by the processor, the steps of a link quality monitoring method are implemented, the link quality monitoring method comprising:
performing, by the terminal, detection for a pre-configured radio link monitoring reference signal (RLM-RS) to determine whether the RLM-RS is received; and
reporting, by the terminal, based on whether the RLM-RS is received, in-synchronization (in-sync) or out-of-synchronization (out-of-sync) used to indicate link quality,
wherein the step of reporting, y the terminal, based on whether the RLM-RS is received, in-sync or out-of-sync used to indicate link quality comprises:
when one such RLM-RS is received, estimating, by the terminal, a hypothetical physical downlink control channel block error rate (PDCCH-BLER) corresponding to the received RLM-RS; or
when one such RLM-RS is not received, skipping, by the terminal, estimating a hypothetical PDCCH-BLER corresponding to the unreceived RLM-RS; and
reporting, by the terminal, the in-sync or out-of-sync used to indicate link quality, based on an estimation result of the hypothetical PDCCH-BLER corresponding to the received RLM-RS and a quantity of unreceived RLM-RSs; or
reporting, by the terminal, the in-sync or out-of-sync used to indicate link quality, based on a quantity of unreceived RLM-RSs.

10. The terminal according to claim 9, wherein the step of reporting, by the terminal, the in-sync used to indicate link quality, based on the estimation result of the hypothetical PDCCH-BLER corresponding to the received RLM-RS and a quantity of unreceived RLM-RSs; or reporting, by the terminal, the in-sync used to indicate link quality, based on a quantity of unreceived RLM-RS comprises:
reporting, by the terminal, the in-sync when a quantity of first RLM-RSs among the received RLM-RSs is greater than or equal to a first value, wherein a hypothetical PDCCH-BLER corresponding to the first RLM-RS is lower than a first threshold.

11. The terminal according to claim 10, wherein the step of reporting, by the terminal, the in-sync when a quantity of first RLM-RSs among the received RLM-RSs is greater than or equal to a first value further comprises:

reporting, by the terminal, the in-sync when the quantity of first RLM-RSs is greater than or equal to the first value and at least one of the following criteria is also met:
a quantity of second RLM-RSs among the received RLM-RSs is less than or equal to a second value, wherein a hypothetical PDCCH-BLER corresponding to the second RLM-RS is higher than a second threshold;
a quantity of third RLM-RSs is less than or equal to a third value, wherein the third RLM-RS is an unreceived RLM-RS; or
a sum of the quantity of second RLM-RSs and the quantity of third RLM-RSs is less than or equal to a fourth value.

12. The terminal according to claim 11, wherein at least one of the first value, the second value, the third value, and the fourth value is determined by the terminal, or configured by a network-side device through radio resource control RRC signaling, or indicated by a network-side device through a media access control control element (MAC CE), or indicated by a network-side device through downlink control information (DCI).

13. The terminal according to claim 9, wherein the step of reporting, by the terminal, the out-of-sync used to indicate link quality, based on the estimation result of the hypothetical PDCCH-BLER corresponding to the received RLM-RS and a quantity of unreceived RLM-RSs; or reporting, by the terminal, the out-of-sync used to indicate link quality, based on a quantity of unreceived RLM-RS comprises:
reporting, by the terminal, the out-of-sync when at least one of the following criteria is met:
a quantity of first RLM-RSs among the received RLM-RSs is less than a first value, wherein a hypothetical PDCCH-BLER corresponding to the first RLM-RS is lower than a first threshold;
a quantity of third RLM-RSs is greater than or equal to a fifth value, wherein the third RLM-RS is an unreceived RLM-RS; or
a sum of a quantity of second RLM-RSs among the received RLM-RSs and the quantity of third RLM-RSs is greater than or equal to a sixth value, wherein a hypothetical PDCCH-BLER corresponding to the second RLM-RS is higher than a second threshold.

14. The terminal according to claim 13, wherein at least one of the first value, the fifth value, and the sixth value is determined by the terminal, or configured by a network-side device through RRC signaling, or indicated by a network-side device through a MAC CE, or indicated by a network-side device through DCI.

15. The terminal according to claim 10, wherein the first value is 1.

16. The terminal according to claim 9, wherein
before the step of performing, by the terminal, detection for a pre-configured RLM-RS to determine whether the RLM-RS is received, the method further comprises:
receiving, by the terminal, configuration information of the RLM-RS, wherein the configuration information comprises a location of a time-frequency resource for transmitting each RLM-RS and a parameter for generating a sequence of the RLM-RS; and
the performing, by the terminal, detection for a pre-configured RLM-RS to determine whether the RLM-RS is received comprises:
at the transmitting location of the time-frequency resource, performing, by the terminal, sequence correlation detection on the RLM-RS based on the parameter for generating the sequence of the RLM-RS, to determine whether the RLM-RS is received.

17. The terminal according to claim 13, wherein the first value is 1.

18. A non-transitory computer-readable storage medium, wherein the non-transitory computer-readable storage medium stores a computer program therein, and when the computer program is executed by a processor of a terminal, the steps of a link quality monitoring method are implemented, the link quality monitoring method comprising:
    performing, by the terminal, detection for a pre-configured radio link monitoring reference signal (RLM-RS) to determine whether the RLM-RS is received; and
    reporting, by the terminal, based on whether the RLM-RS is received, in-synchronization (in-sync) or out-of-synchronization (out-of-sync) used to indicate link quality,
    wherein the step of reporting, by the terminal, based on whether the RLM-RS is received, in-sync or out-of-sync used to indicate link quality comprises:
    when one such RLM-RS is received, estimating, by the terminal, a hypothetical physical downlink control channel block error rate (PDCCH-BLER)) corresponding to the received RLM-RS; or
    when one such RLM-RS is not received, skipping, by the terminal, estimating a hypothetical PDCCH-BLER corresponding to the unreceived RLM-RS; and
    reporting, by the terminal, the in-sync or out-of-sync used to indicate link quality, based on an estimation result of the hypothetical PDCCH-BLER corresponding to the received RLM-RS and a quantity of unreceived RLM-RSs; or
    reporting, by the terminal, the in-sync or out-of-sync used to indicate link quality, based on a quantity of unreceived RLM-RSs.

19. The non-transitory computer-readable storage medium according to claim 18, wherein the step of reporting, by the terminal, the in-sync used to indicate link quality, based on the estimation result of the hypothetical PDCCH-BLER corresponding to the received RLM-RS and a quantity of unreceived RLM-RSs; or reporting, by the terminal, the in-sync used to indicate link quality, based on a quantity of unreceived RLM-RSs comprises:
    reporting, by the terminal, the in-sync when a quantity of first RLM-RSs among the received RLM-RSs is greater than or equal to a first value, wherein a hypothetical PDCCH-BLER corresponding to the first RLM-RS is lower than a first threshold.

20. The non-transitory computer-readable storage medium according to claim 18, wherein the step of reporting, by the terminal, the out-of-sync used to indicate link quality, based on the estimation result of the hypothetical PDCCH-BLER corresponding to the received RLM-RS and a quantity of unreceived RLM-RSs; or reporting, by the terminal, the out-of-sync used to indicate link quality, based on a quantity of unreceived RLM-RSs comprises:
    reporting, by the terminal, the out-of-sync when at least one of the following criteria is met;
    a quantity of first RLM-RSs among the received RLM-RSs is less than a first value, wherein a hypothetical PDCCH-BLER corresponding to the first RLM-RS is lower than a first threshold;
    a quantity of third RLM-RSs is greater than or equal to a fifth value, wherein the third RLM-RS is an unreceived RLM-RS; or
    a sum of a quantity of second RLM-RSs among the received RLM-RSs and the quantity of third RLM-RSs is greater than or equal to a sixth value, wherein a hypothetical PDCCH-BLER corresponding to the second RLM-RS is higher than a second threshold.

* * * * *